United States Patent [19]

Uchida et al.

[11] Patent Number: 4,965,759

[45] Date of Patent: Oct. 23, 1990

[54] SPREAD-SPECTRUM RECEIVER

[75] Inventors: Yoshitaka Uchida; Masahiro Hamatsu; Masaharu Mori, all of Tokyo, Japan

[73] Assignee: Clarion Co., Ltd., Tokyo, Japan

[21] Appl. No.: 294,773

[22] Filed: Jan. 6, 1989

[30] Foreign Application Priority Data

Jan. 14, 1988 [JP] Japan .............................. 63-007141
Jan. 14, 1988 [JP] Japan .............................. 63-007142
Jan. 14, 1988 [JP] Japan .............................. 63-007143

[51] Int. Cl.5 .................... H04J 13/00; H04B 15/00; H04L 27/10; H04L 27/06
[52] U.S. Cl. .................................... 364/604; 370/18; 375/1; 375/55; 375/96; 375/111
[58] Field of Search ................ 364/604, 728.03, 819; 375/1, 115, 55, 96, 111, 94, 9; 358/296; 329/311; 370/18

[56] References Cited

U.S. PATENT DOCUMENTS

| 4,494,213 | 1/1989 | Thompson | 364/819 |
|---|---|---|---|
| 4,530,103 | 7/1985 | Mosley | 375/1 |
| 4,561,089 | 12/1985 | Rouse | 370/18 |
| 4,567,588 | 1/1986 | Jerrim | 370/18 |
| 4,644,523 | 2/1987 | Horwitz | 375/115 |
| 4,686,655 | 8/1987 | Hyatt | 364/728.03 |
| 4,775,951 | 10/1989 | Iwahashi et al. | 364/728.03 |
| 4,789,903 | 12/1988 | Kamada et al. | 358/296 |
| 4,833,694 | 5/1989 | Tours et al. | 364/728.03 |

Primary Examiner—Jerry Smith
Assistant Examiner—Jim Trammell
Attorney, Agent, or Firm—Flynn, Thiel, Boutell & Tanis

[57] ABSTRACT

A correlation pulse generator used in a receiver of a spread spectrum communication system comprises peak hold circuit for holding peak values of positive and negative correlation spikes, threshold setting circuits for generating thresholds based on the peak values, and a comparing circuit for comparing the threshold with a correlation spike to generate a correlation pulse, so that when a level difference exists between positive and negative correlation spike levels of a correlation output, their peaks can be held independently, and thresholds based on the peaks can be generated independently.

10 Claims, 5 Drawing Sheets

SPREAD-SPECTRUM RECEIVER

FIELD OF THE INVENTION

This invention relates to a receiver used in a spread spectrum communication system, and more particularly to a correlation pulse generator suitable for use in such a receiver.

BACKGROUND OF THE INVENTION

In a spread spectrum spectrum communication system, it is essential that it can obtain an appropriate threshold value according to any change in the correlator output so as to never fail to detect a required correlation output.

A prior art system is shown, for example, in Japanese Post-Examination Publication No. JP-P-60-5639B entitled "Receiving Circuit in a Spread Spectrum Communication System".

This system is arranged so that peaks of positive and negative correlated spikes of an output of a matched filter are held respectively by a peak hold circuit and are subsequently added. A threshold circuit which generates a threshold value proportional to the resulting peak hold value permits correlation spikes to pass therethrough to perform data demodulation. A circuit arrangement thereof is shown in FIG. 3 where reference numeral 21 refers to a correlator, 22 to a peak hold circuit, 23 to a computing circuit, 24 to a flip-flop, 25 to a shift clock generating circuit, 26 to a shift circuit, 27 to a PN code, 28 to a delay circuit, and 29 and 30 to multipliers which behave here as inverters by multiplying −1. That is, a peak hold circuit 31 holds a positive peak whereas a peak hold circuit holds a negative peak. A threshold is obtained from such a peak value via a variable resistor R3 to use the threshold value to detect a positive correlation spike in a comparator 33 and detect a negative correlation spike in a comparator 34.

The prior art circuit arrangement, however, involves the following problems. In order that the peak hold circuit 22 completely holds the peak of a correlation spike, the interior resistance of a diode D1 or D2 and the time constant of a capacitor C1 or C2 must be very small because the correlation spike width is very narrow. That is, the charge time constant must be small.

In contrast, in case of holding the peak value for a time corresponding to about one period of the correlation spike, the time constant defined by a resistor R or R2 and the capacitor C1 or C2 must be large in order to prevent a decrease in the hold value which is called "droop". That is, the discharge time constant must be large.

Referring to the circuit arrangement of FIG. 3, in order to establish a threshold which is variable in response to changes in the correlation spike $\phi(t)$, the discharge time constant R1C1 or R2C2 of the peak hold circuit must be large as apparent from FIG. 4.

When considering the follow-up property to change in the peak hold value, a peak hold circuit having an excellent hold property, i.e., a large discharge time constant exhibits a poor follow-up property to decrease in the peak value. This is explained below, referring to FIG. 5.

When a correlation spike $\phi(t)$ (in this case, data corresponds to 1,1,0,0) which exhibits level changes shown in FIG. 5 is entered in the peak hold circuit 22, values of the peak hold circuits 31 and 32 are $S_A$ and $S_B$ in (b) and (c).

If a correlation spike 2 smaller than a negative correlation spike 1 or a correlation spike 4 larger than a negative correlation spike 3 is obtained, the capacitor C1 or C2 is not changed and continues to discharge. That is, in the event that the peak value is decreased more than the droop caused by the discharge, the peak value cannot be detected. Further, when a threshold $S_C$ and a threshold $S_D$ obtained by multiplying the threshold value $S_C$ by −1 in the multiplier 30 are as shown in FIG. 5a), correlation spike 1 alone is detected, and correlation spikes 2, 3 and 4 are not detected.

As a result, a demodulated data d(t) is an erroneous data with respect to the inputted data. In FIG. 5, (a) and (e) indicate waveforms of $S_E$ and d(t) of FIG. 3 respectively.

That is, when the correlation spike $\phi(t)$ varies as shown in FIG. 5, it is difficult to detect correlation spikes as far as fixed positive and negative thresholds $S_C$ and $S_D$ are used.

Further, as shown in FIG. 6, also when the received signal level is not changed, it is sometimes difficult to detect correlation spikes using threshold values $S_C$ and $S_D$ obtained through the peak hold circuit 22, because of natures of employed circuits and elements, e.g. a level difference between positive and negative correlation spikes (in FIG. 6, the positive correlation spike is always larger than the negative correlation spike).

OBJECT OF THE INVENTION

It is therefore an object of the invention to provide a peak hold circuit which can reliably follow up changes in the correlator output caused by changes in the received signal level.

A further object of the invention is to provide a circuit capable of reliably demodulating data by never failing to produce an appropriate threshold signal and obtain a correlation pulse regardless of any change in the correlator output caused by a change in the received signal level.

A still further object of the invention is to provide a circuit capable of reliably demodulating data by never failing to establish an appropriate threshold and obtain a correlation pulse even when the correlator output varies due to changes in the received signal level and a level difference exists between positive and negative correlation spike levels of the correlator output.

SUMMARY OF THE INVENTION

In order to achieve the aforementioned object, the invention provides a correlation pulse generator including a correlator to correlate a received signal with a reference signal to obtain a correlation spike to produce a correlation pulse based on the correlation spike, said generator comprising:

first peak hold means (2, 4 and 6) for holding the peak value of a correlation spike;

second peak hold means (8) for holding said peak value held by said first peak hold means;

a threshold setting circuit (12) responsive to a signal held in said second peak hold means to output a threshold signal; and a comparing circuit for comparing said threshold signal with said correlation spike and generating said correlation pulse.

In order to attain the same object, the invention provides a correlation pulse generator including a correlator to correlate a received signal with a reference signal to obtain a correlation spike to produce a correlation pulse based on the correlation spike, said generator comprising:

first peak hold means (2, 4 and 6) for holding the peak value of a correlation spike;

second peak hold means (8) for holding said peak value held by said first peak hold means;

a threshold setting circuit (12) responsive to a signal held in said second peak hold means to output a threshold signal;

a comparing circuit for comparing said threshold signal with said correlation spike and generating said correlation pulse; and control means responsive to an output of said comparing circuit to control the peak value holding motion of said second peak hold means.

In order to accomplish the further object, the invention provides a correlation pulse generator including a correlator to correlate a received signal with a reference signal to obtain a correlation spike to produce a correlation pulse based on the correlation spike, said generator comprising:

an A/D converting circuit for converting said correlation spike into a digital pulse;

a first latch circuit for latching an output of said A/D converting circuit;

a first comparing circuit for comparing an output of said first latch circuit with an output of said A/D converting circuit and controlling the latching motion of said first latch circuit;

a second latch circuit for holding said output of said first latch circuit;

a threshold setting circuit for outputting a threshold signal based on a signal held by said second latch circuit; and a second comparing circuit for comparing said threshold signal with said output of said A/D converting circuit and generating said correlation pulse.

In order to attain the still further object, the invention provides a correlation pulse generator including a correlator to correlate a received signal with a reference signal to obtain a correlation spike to produce a correlation pulse based on the correlation spike, said generator comprising:

first peak hold means for holding a first peak value of a positive correlation spike;

a first threshold setting circuit for generating a first threshold based on said first peak value;

a first comparing circuit for comparing said first threshold with said correlation spike and generating a first correlation pulse;

a second peak hold circuit for holding a second peak value of a negative correlation spike;

a second threshold setting circuit for generating a second threshold based on said second peak value; and a second comparing circuit for comparing said second threshold with said correlation spike and generating a second correlation pulse.

DETAILED DESCRIPTION

Figure 1:
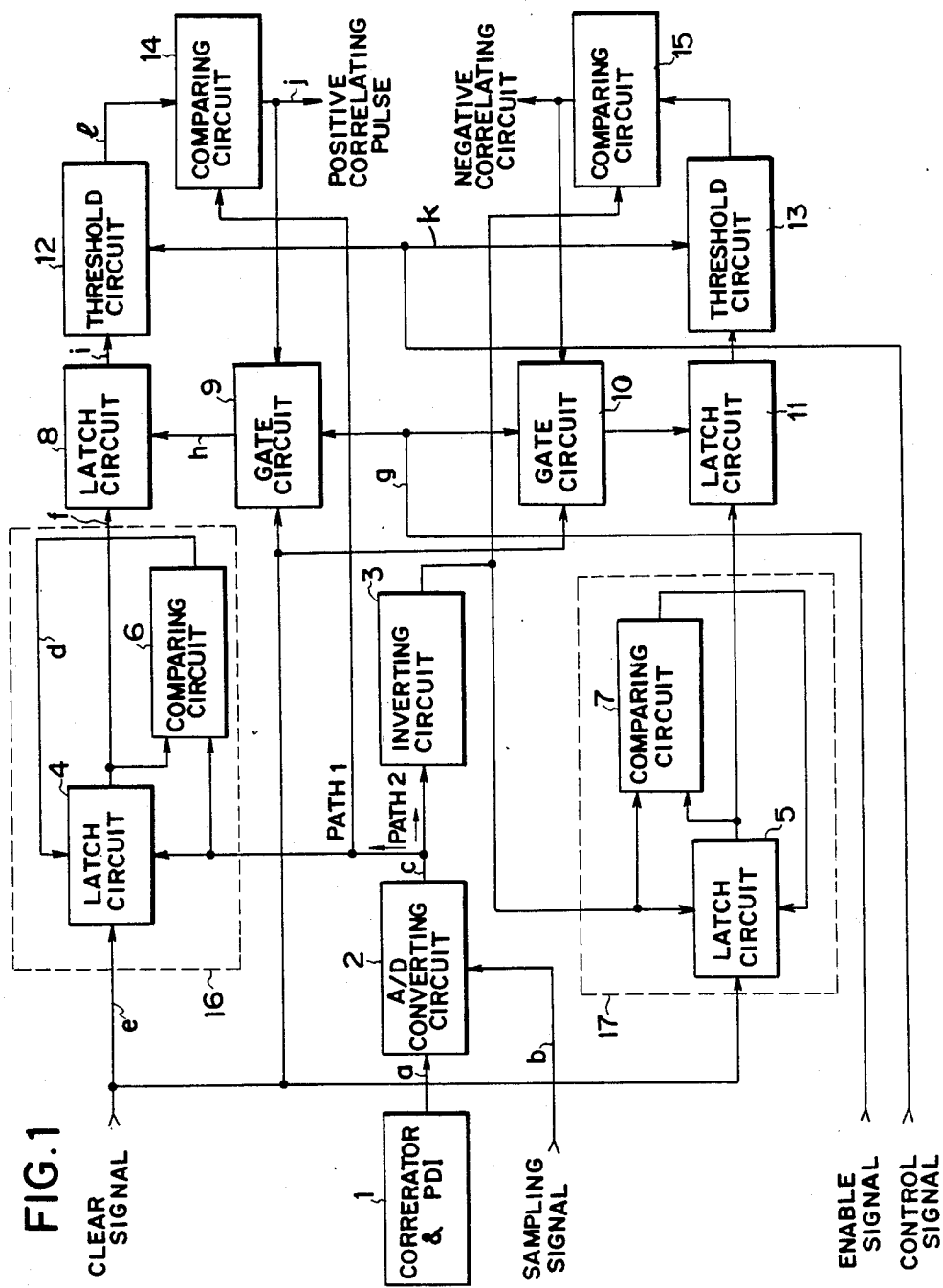
FIG. 1 is a block diagram showing a correlation pulse generating circuit used in a spread spectrum receiver according to the invention.

The invention is described below in detail, referring to a preferred embodiment illustrated in the drawings. The embodiment should never be construed to be any limitation of the invention, but various modifications and improvements are involved in the invention without departing from the scope thereof.

Figure 2:
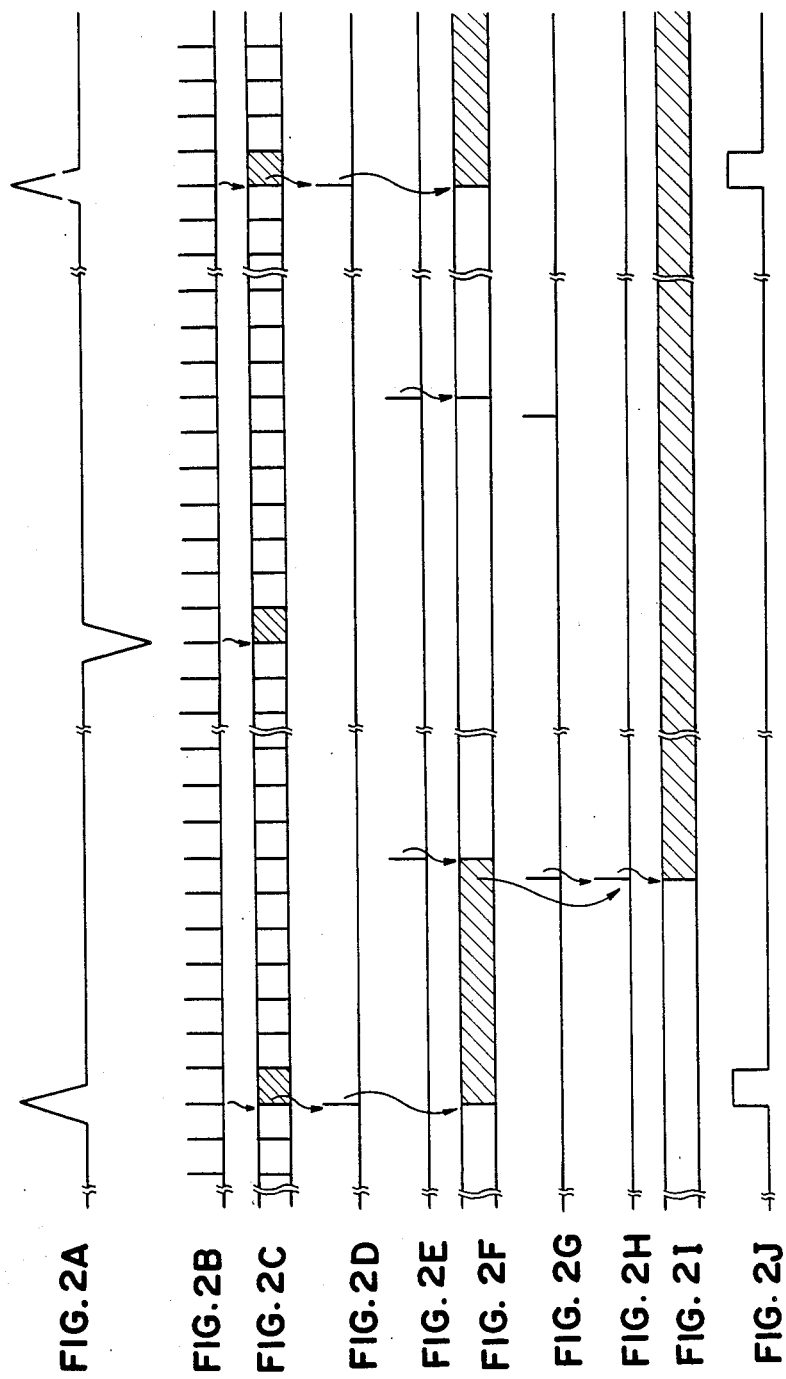
FIGS. 2A, 2B, 2C, 2D, 2E, 2F, 2G, 2H, 2I, and 2H together constitute a timing chart of signals at respective points of the circuit of FIG. 1.
Figure 3:
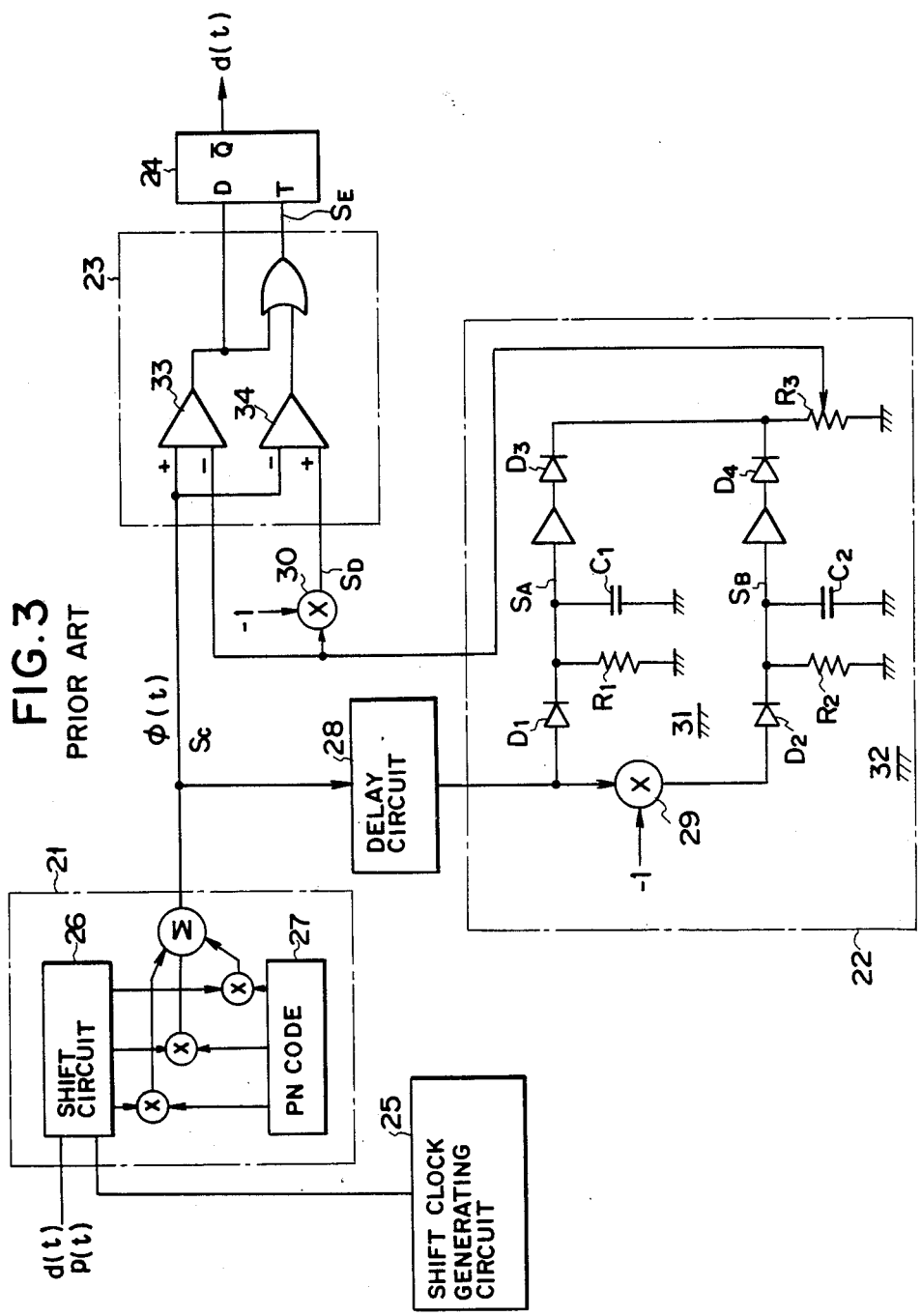
FIG. 3 is a circuit diagram of a prior art correlation pulse generating circuit.
Figure 4A:
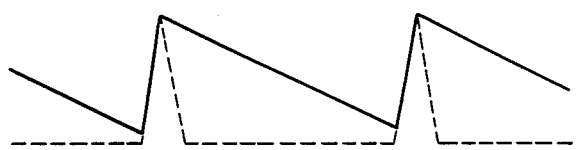
FIGS. 4A and 4b show respective voltage waveforms under a small discharge time constant (FIG. 4A) and a large discharge time constant at FIG. 4B.
Figure 4B:
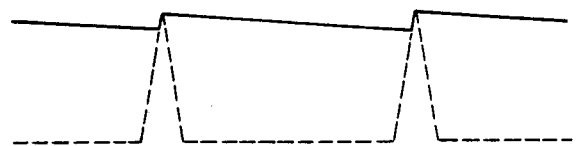
Figure 6:
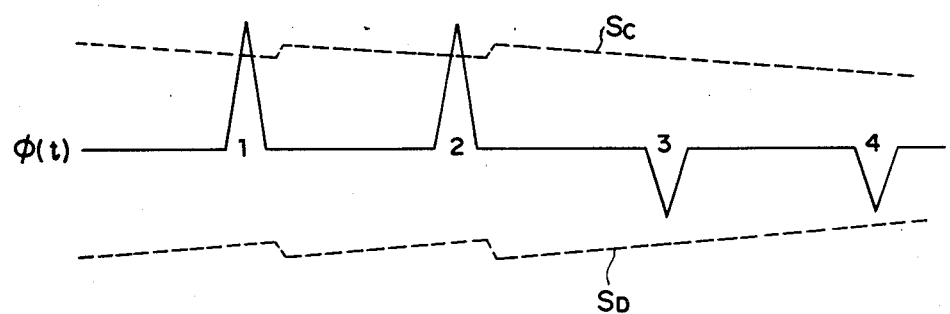
FIG. 6 shows waveforms of signals at respective points of the circuit of FIG. 3 in presence of a level difference between correlation spikes.
Figure 5A:
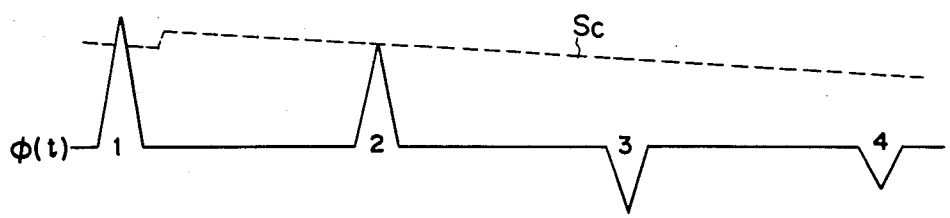
FIGS. 5A, 5B, 5C, 5D, and 5E show respective waveforms of respective signals at respective points of the circuit of FIG. 3.
Figure 5B:
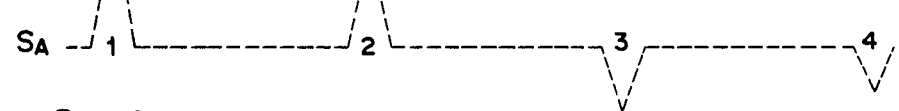
Figure 5C:
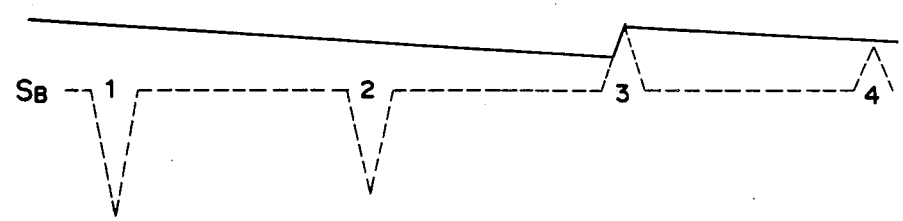
Figure 5D:
Figure 5E:
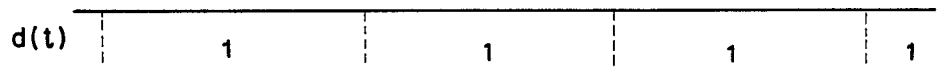

FIG. 1 is a block diagram of a correlation pulse generating circuit used in a spread spectrum receiver according to the invention, and FIG. 2 is a timing chart of signals at respective points of the circuit of FIG. 1. In FIG. 1, reference numeral 1 refers to a correlation/PDI (post-detection integration: integrating circuit), 2 to an A/D converting circuit, 3 to an inverting circuit, 4, 5, 8 and 11 to latch circuits, 6, 7, 14 and 15 to comparing circuits, 9 and 10 to gate circuits, 12 and 13 to threshold circuits, and 16 and 17 to peak hold circuits.

The A/D converting circuit 2 converts a correlation spike a into a digital signal, based on a sampling signal b, and an output c is obtained. Results of sampling the period including the correlation spike a are present in hatched portions of the output c of the A/D converting circuit 2.

The output c of the A/D converting circuit 2 is subsequently divided into paths 1 and 2. The path 1 is used for detecting positive correlation spikes whereas the path 2 is used for detecting negative correlation spikes.

The path 2 may be established by the same circuit arrangement as the path 1 by inverting the polarity of data of N bits of the output c of the A/D converting circuit 2. Therefore, after the A/D converting circuit 2, the path 2 is entered in the inverting circuit 3. Since the circuit arrangements of the inverting circuit 3 et seq. of the path 2 are identical to those of the path 1, operations of the path 1 alone are explained.

The output c of the A/D converting circuit 2 is entered in the latch circuit 4 and the comparing circuit 6. The comparing circuit 6 compares the output c of the A/D converting circuit 2 with data f stored in the latch circuit 4. When it is judged that the output c of the A/D converting circuit 2 is larger, a pulse d is obtained. The latch circuit 4 is triggered by the pulse d to store the data of the output c of the A/D converting circuit 2, so that the data f of the latch circuit 4 is renewed.

By comparing the output c of the A/D converting circuit 2 with the data f of the latch circuit 4 sequentially and renewing the data f stored in the latch circuit 4, the peak hold circuit 16 for obtaining the maximum value of the output c of the A/D converting circuit 2 is arranged.

The latch circuit 4 clears its stock f in response to a clear signal e every period of the correlation spike, and holds a new peak of the last period of the correlation spike. The pulse period of the clear signal e is equal to the period of the correlation spike. That is, the peak hold circuit having this circuit arrangement can reliably hold the peak value of one period of the correlation spike.

After this, before clearing the latch circuit 4 by the clear signal e, the maximum value of the output c of the A/D converting circuit 2 corresponding to one period of the correlation spike stored in the latch circuit 4 is stored in the latch circuit 8 triggered by a signal h. Here, when a positive correlation pulse j enters in the gate circuit 9 before the pulse of the clear signal e enters, the gate circuit 9 permits an enable signal g to pass therethrough and causes the signal h to enter in the latch circuit 8.

When the positive correlation pulse j does not exist, the gate is shut, the signal h is not outputted, and the latch circuit 8 does not receive any trigger pulse. Therefore, no change occurs in an output i of the latch circuit 8.

The latch circuit 8 holds the peak value of one period of the correlation spike, and in presence of a positive correlation pulse, it judges whether the peak value data of one period of the correlation spike heretofore stored therein should be renewed or not in a subsequent period of the correlation spike.

By employing this arrangement, the circuit can reliably hold the peak value of a correlation spike within one period of the correlation spike a, can reliably follow up changes in the peak value, and can prevent erroneous operations upon changes in the polarity of the correlation spike.

The output data i of the latch circuit 8 is entered in the threshold circuit 12 which performs computation of the output data i of the latch circuit 8 and a control signal k indicative of the multiplication factor, and generates a threshold l. The threshold l is a digital signal of N bits, and the control signal k may be generated in a CPU, etc., for example, The threshold ( obtained in the threshold circuit 12 is entered in the comparing circuit 14. The comparing circuit 14 compares the output c of the A/D converting circuit 2 with the threshold (, and when the output c of the A/D converting circuit 2 is larger than the threshold l, an output j is obtained. Thus the correlation pulse j corresponding to the correlation spike is obtained.

More specifically, by storing in the latch circuit 8 the peak value of the output c of the A/D converting circuit 2 corresponding to one period of the correlation spike obtained by the peak hold circuit 16, the threshold l of the subsequent one period is established. Even if there is not output c of the A/D converting circuit 2 above the threshold ( of this one period and no correlation pulse j is obtained, the data i of the latch circuit 8 is maintained and not lost, so that the threshold l is set at the same value also in the subsequent one period.

Therefore, as shown in FIG. 2, although the data f stored in the latch circuit 4 of the peak hold circuit 16 in the period including a negative correlation spike exhibits a noise level, no erroneous detection of the correlation pulse j occurs in the comparing circuit 14 as far as the latch circuit 8 holds the peak value of the preceding period.

Further, the threshold l for detection of a correlation spike in the subsequent period to the negative correlation spike may be established by the output i of the latch circuit 8, and it is possible to detect correlation spikes alone.

As described above, by dividing the circuit after the A/D converting circuit 2 into path 1 and path 2, two paths effect their peak holding operations independently and establish thresholds l independently, so that no detection error occurs even upon changes in the correlation spike a or in presence of a level difference between positive and negative poles of the correlation spike a.

Although the illustrated peak hold circuit has an arrangement based on a digital signal processing, the invention can be used for an analog signal processing arrangement by replacing the latch circuit by a hold circuit.

As described above, according to the invention, also upon changes in the correlation output caused by changes in the input level, or in presence of a level difference between positive and negative spike levels of the correlator output, precise peak holding operation and precise data demodulation are ensured.

What is claimed is:

1. A spread-spectrum receiver, comprising correlator means for correlating a received signal with a reference signal to obtain a correlation spike, and pulse generating means for generating a correlation pulse in response to the correlation spike, said pulse generating means including:

analog to digital converter means responsive to a periodic sampling signal for converting a peak value of each said correlation spike from an analog from into a digital form;

first peak hold means for holding a digital peak value from said converter means, said first peak hold means comparing the peak value therein with a subsequent digital peak value from said converter means and thereafter holding the subsequent peak value when the comparison shows that the subsequent peak value is larger;

second peak hold means responsive to a periodic enable signal for accepting and holding the peak value present in said first peak hold means;

threshold setting means responsive to the peak value held in said second peak hold means for determining a threshold value;

comparator means for comparing digital peak values from said converter means with said threshold value and for generating a correlation pulse if a peak value from said converter means exceeds said threshold value; and means for periodically generating a clear signal which clears said peak value in said first peak hold means.

2. A spread spectrum receiver according to claim 1, wherein said threshold setting means generates as said threshold value a value corresponding to the peak value held in said second peak hold means multiplied by a multiplication factor.

3. A spread spectrum receiver, comprising correlator means for correlating a received signal with a reference signal to obtain a correlation spike, and pulse generating means for generating a correlation pulse in response to the correlation spike, said pulse generating means including:

analog to digital converter means responsive to a periodic sampling signal for converting a peak value of each said correlation spike from an analog form into a digital form;

first peak hold means for holding a digital peak value from said converter means, said first peak hold means comparing the peak value therein with a subsequent digital peak value from said converter means and thereafter holding the subsequent peak value when the comparison shows that the subsequent peak value is larger;

second peak hold means responsive to a periodic enable signal for accepting and holding the peak value present in said first peak hold means;

threshold setting means responsive to the peak value held in said second peak hold means for determining a threshold value;

comparator means for comparing digital peak values from said converter means with said threshold value and for generating a correlation pulse if a peak value from said converter means is above said threshold value;

control means responsive to an output of said comparator means for controlling the application to said second peak hold means of said enable signal; and means for periodically generating a clear signal which clears said peak value in said first peak hold means.

4. A spread spectrum receiver according to claim 3, wherein said first peak hold means includes a latch circuit which latches the peak value held therein; and includes a comparator circuit which compare the peak value latched in said latch circuit with the subsequent peak value from said converter means and loads the subsequent peak value into said latch circuit when said subsequent peak value is larger than the peak value held in said latch circuit.

5. A spread spectrum receiver according to claim 3, wherein said control means includes a gate circuit which controls the application of said enable signal to said second peak hold means.

6. A spread spectrum receiver, comprising correlator means for correlating a received signal with a reference signal to obtain one of a positive correlation spike and a negative correlation spike, and pulse generating means for generating correlation pulses in response to correlation spikes, said pulse generating means including:

analog to digital converter means responsive to a periodic sampling signal for converting a peak value of each said correlation spike from an analog form to a digital form;

first peak hold means for holding a digital peak value from said converter means, and for holding in place thereof a subsequent peak value when the subsequent peak value from said converter means is larger than the peak value currently held in said first peak hold means;

first threshold setting means responsive to the peak value held in said first peak hold means for determining a first threshold value;

first comparator means for comparing peak values from said converter means with said first threshold value and for generating a first correlation pulse if a peak value from said converter means exceeds said first threshold value;

polarity inverting means for inverting the polarity of said digital peak value from said converter means;

second peak hold means for holding an inverted peak value from said polarity inverting means, and for holding in place thereof a subsequent inverted peak value when the subsequent inverted peak value from said polarity inverting means is larger than the peak value currently held in said second peak hold means;

second threshold setting means responsive to the peak value held in said second peak hold means for determining a second threshold value; and second comparator means for comparing inverted peak values from said polarity inverting means with said second threshold value and for generating a second correlation pulse if an inverted peak value from said polarity inverting means exceeds said second threshold value.

7. The spread spectrum receiver according to claim 6, wherein said first peak hold means includes a first latch circuit which latches the peak value held therein and which compares the peak value held therein with a subsequent peak value from said converter means and latches the subsequent peak value when the subsequent peak value is larger, and includes a second latch circuit which, in response to a periodic enable signal, latches the peak value currently held in said first latch circuit; wherein said second peak hold means includes a third latch circuit which latches the peak value held therein and which compares the peak value held therein with a subsequent peak value from said polarity inverting means and latches the subsequent peak value when the subsequent peak value is larger, and includes a fourth latch circuit which, in response to a periodic enable signal, latches the peak value currently held in said third latch circuit; and including means for periodically generating a clear signal which clears the peak values in said first and third latches.

8. A spread spectrum receiver according to claim 7, wherein said second latch circuit is controlled by an output of said first comparator means, and wherein said fourth latch circuit is controlled by an output of said second comparator means.

9. A spread spectrum receiver according to claim 6, wherein said first and second threshold values produced by said first and second threshold setting means correspond respectively to the peak values respectively held in said first and second hold means each multiplied by a multiplication factor.

10. A spread spectrum receiver according to claim 9, wherein said multiplication factor is controlled by a CPU.

* * * * *

UNITED STATES PATENT AND TRADEMARK OFFICE
CERTIFICATE OF CORRECTION

PATENT NO. : 4 965 759
DATED : October 23, 1990
INVENTOR(S) : Yoshitaka UCHIDA et al It is certified that error appears in the above-identified patent and that said Letters Patent is hereby corrected as shown below:

Column 6, line 27; change "from" to ---form---.

Signed and Sealed this

Twenty-sixth Day of May, 1992

Attest:

DOUGLAS B. COMER

Attesting Officer

Acting Commissioner of Patents and Trademarks